United States Patent
Maloney

(10) Patent No.: US 11,351,638 B2
(45) Date of Patent: Jun. 7, 2022

(54) MACHINE TOOLING WITH A ROTARY PUNCH

(71) Applicant: Penn Engineering & Manufacturing Corp., Danboro, PA (US)

(72) Inventor: Michael Maloney, Doylestown, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 68 days.

(21) Appl. No.: 16/681,042

(22) Filed: Nov. 12, 2019

(65) Prior Publication Data

US 2020/0156193 A1    May 21, 2020

Related U.S. Application Data

(60) Provisional application No. 62/767,702, filed on Nov. 15, 2018.

(51) Int. Cl.
  *B23P 19/00* (2006.01)
  *B23P 19/06* (2006.01)
  *B21J 15/32* (2006.01)

(52) U.S. Cl.
  CPC .................. *B23P 19/007* (2013.01)

(58) Field of Classification Search
  CPC ........ B23P 19/007; B23P 19/062; B21J 15/32
  See application file for complete search history.

(56) References Cited

U.S. PATENT DOCUMENTS

| | | | | |
|---|---|---|---|---|
| 3,735,993 | A | * | 5/1973 | Seibert ................ B23B 31/1071 279/75 |
| 3,750,518 | A | * | 8/1973 | Rayburn ............... F16B 19/083 411/29 |
| 7,377,019 | B2 | * | 5/2008 | Haytayan .............. B25B 21/002 173/1 |

(Continued)

FOREIGN PATENT DOCUMENTS

| JP | 2000220619 A | * | 8/2000 |
|---|---|---|---|
| JP | 2000220619 A2 | | 8/2000 |

OTHER PUBLICATIONS

Murase et al.; Fumble Preventative Bolt and its Excessive Tool (JP-2000220619-A); EPO English Machine Translation; pp. 1-2 (Year: 2021).*

*Primary Examiner* — Bayan Salone
(74) *Attorney, Agent, or Firm* — Gregory J. Gore, Esq.

(57) ABSTRACT

A tooling system has means for applying a vacuum to hold the fastener at the working end of the tool. A cavity in a hollow pusher pin has lateral ports for exclusively providing a airway between the vacuum source and the fastener. In other embodiments of the invention the pusher pin has fastener-gripping jaws in the form of balls moveable within lateral passageways in the pusher pin open into the cavity. The balls are biased inwardly against the fastener by an outer elastic band on the tool body which encircles the pusher pin. When adapted for installing magnetic-release type fasteners, the bottom end of the pusher pin is of reduced diameter for insertion into a magnetic release fastener. The fastener-receiving panel is supported by an anvil having a magnet whereby the fastener is released from the pusher pin as the fastener is pressed into the panel.

19 Claims, 4 Drawing Sheets

(56) References Cited

U.S. PATENT DOCUMENTS

| | | | |
|---|---|---|---|
| 7,607,871 B1 * | 10/2009 | Nelson | B23B 31/20 408/110 |
| 10,058,910 B2 | 8/2018 | Weyland | |
| 2010/0316455 A1 * | 12/2010 | Sanchez | A47L 5/22 408/58 |
| 2011/0164945 A1 | 7/2011 | Lathabai et al. | |
| 2015/0043995 A1 | 2/2015 | Lee et al. | |
| 2017/0008069 A1 | 1/2017 | Babej et al. | |
| 2017/0259326 A1 | 9/2017 | Skolaude | |

* cited by examiner

MACHINE TOOLING WITH A ROTARY PUNCH

RELATED APPLICATIONS

This is a non-provisional patent application related to provisional patent application entitled "Machine Tooling with Rotary Punch and Magnetic Anvil", Ser. No. 62/767,702 filed Nov. 15, 2018 priority from which is hereby claimed.

FIELD OF THE INVENTION

This disclosure describes three types of rotary installation punches, and one magnetic release anvil system that enable the use of a CNC machining center to install rotary installation fasteners directly with a CNC machining center.

BACKGROUND OF THE INVENTION

Currently for many consumer electronics, a metal chassis is used for aesthetics and mechanical rigidity. These housings can be created in high speed CNC machining center. Once a chassis is cut, it is moved to other locations for assembly of hardware and ultimately finishing by means of anodizing or other cosmetic process. Frequently clinching fasteners are used in these chassis, which can cause a permanent pressure mark on the cosmetic surface due to the high installation forces involved. A mark is unacceptable. To accommodate the high forces involved, typically a thicker area or boss is machined into the chassis where the fasteners are pressed in. The thicker area is more capable of absorbing the high stresses without transferring a mark to the cosmetic surface. The necessity of using a thicker material prior to machining is undesirable as machining time and scrap are significantly increased. Also, when the chassis is ready for hardware installation, it must be re-fixtured in a secondary machine for hardware attachment, often at another location.

Magnetic-release fasteners are known primarily in the clothing industry for attaching security tags to garments to prevent retail theft in the retail environment. These fasteners have not gained wide acceptance in the field of general hardware fasteners although they have many possible uses. There is no known automated system for assembling this type of fastener to other manufacturing components.

There is therefore a need in the fastening arts for improving the cost and efficiency for producing a fastening system for very thin panels. In particular, there is a need for a fastener for metal chassis used in electronics with adequate attachment performance as well as acceptable cosmetic characteristics. There is also a need for a simplified automated system of rotary installing fasteners. There is a further need for an automated assembly system in which magnet-release type fasteners can be employed.

SUMMARY OF THE INVENTION

In order to meet the needs in the fastening arts, the following embodiments of the invention have been devised. Each of the embodiments employs rotary installation in a simplified automated system utilizing a standard CNC machining center where the installation rotary punch also serves the function of individual fastener pickup and placement.

As disclosed herein, the use of rotary installation greatly reduces the installation forces experienced with standard clinching fasteners due to the reduction in axial projected area of the displacer. Rotating of the reduced area displacer still pushes metal over a retention feature on the fastener, but torque is the main driver instead of axial force. This greatly reduces the severity of cosmetic marking very thin receiving panels and often eliminates marking all together. Because axial force is greatly reduced, the metal thickness of the chassis panel can also be significantly reduced saving scrap and machine time. Secondary rotary installation machines can be used, but since a CNC machining center has both torque and axial force capability, the need to re-fixture at a second location is eliminated. Additional cost is realized when the actual need for the purchase of secondary installation machines is also eliminated.

Embodiments of the invention employ different means of holding the fastener to the installation tool including vacuum control and friction gripping. In a specific application of the present invention, the use of magnetic-release fasteners is integrated into an automated assembly process which also utilizes rotary clinching.

More specifically, the applicant has devised a tooling system for installing a fastener comprising a tool body having a top drive end and a bottom working end which is centered about an axis of rotation. A plurality of helical displacers on the working end act upon a workpiece to displace material of the workpiece onto the fastener. A cavity in the tool at the working end temporarily holds the fastener to be installed on the workpiece. The displacers comprise arcuate ramps centered about the axis of rotation and each displacer extends between points of maximum and minimum height of the ramps. In one embodiment, three identical displacers symmetrically disposed about the axis of rotation are employed.

The tooling system employs a CNC machine for simultaneously rotating the tool body while moving it axially. The CNC machine also picks up the fastener and moves it laterally to deliver the fastener to an installation site. In one embodiment the tooling system has means for applying a vacuum from a source to the top end of the tool and the tool body has an airway between the top and bottom ends whereby the vacuum holds the fastener in the cavity. In several embodiments the fastener-holding cavity is located in the end of a resiliently biased pusher pin which acts between the tool body and the fastener which is adapted to press upon the fastener during installation of the fastener into the workpiece. The pusher pin has a spring acting between the tool body and a top end of the pusher pin. When a vacuum is employed the pusher pin can be hollow and has lateral ports for exclusively providing a airway between the vacuum source and the fastener.

In other embodiments of the invention the pusher pin has fastener-gripping means comprising a plurality of jaws in the form of balls moveable within lateral passageways in the pusher pin open into the cavity in the pusher pin. The balls are biased inwardly against the fastener by an outer elastic band on the tool body which encircles the pusher pin. Preferably the ball-engaging bottom end of the elastic band has a 45-degree chamfer. The inward end of each of the passageways has narrowing lip for retaining the balls.

In yet another embodiment of the invention the tooling system can install magnetic-release type fasteners. In this case the tool body has an axially centered pusher pin with a bottom end of reduced diameter adapted for insertion into a magnetic release fastener whereby the fastener is held onto the tooling during transport to the installation site. The pusher pin has a collar which abuts the top of the fastener to press it against the receiving workpiece, preferably a panel with a blind receiving hole. The fastener-receiving panel is supported by an anvil having a magnet whereby the fastener is released from the pusher pin as the fastener is pressed into the panel. During installation a flange at the bottom of the fastener receives the cold flow of material from the panel displaced by the displacers.

Thus, it is the main object of the invention to provide a rotary-installed fastener in an automated tooling system which employs a standard CNC machine center. It is a further object to provide a tooling system which can pick and place magnetic release type fasteners in an installation process. These and other objects and advantages of the inventive tooling system will be apparent to those of skill in the art from the following figures of drawing and description of several embodiments thereof.

DESCRIPTION OF ONE EMBODIMENT OF THE INVENTION

Figure 1:
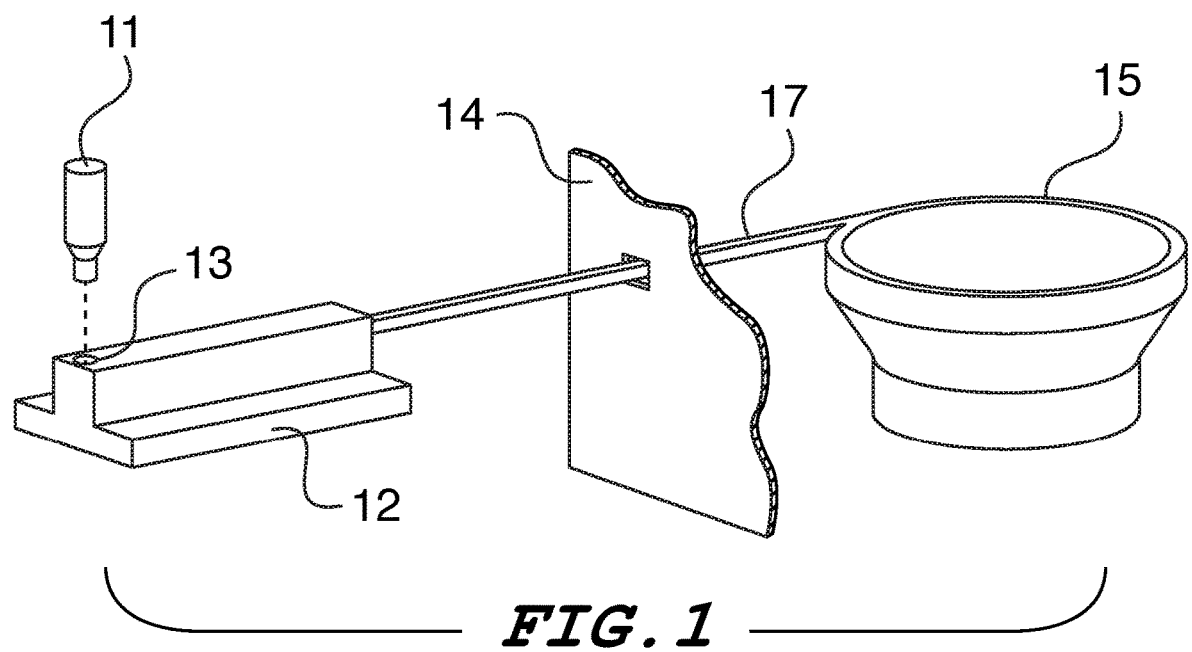
FIG. 1 is a top left isometric view a fastener delivery system.

FIG. 1 illustrates the present system for feeding fasteners directly into a CNC machining center for the purposes of rotary installation. The progression of fasteners from the source bowl to the install punch is as follows:

1. Parts are poured loosely in bulk into the vibratory feeder bowl 15.

2. Parts are then fed out of the bowl 15, singulated by an escapement and shuttle, and fed through a flexible feed tube, or a rigid track 17 that passes through a small opening in a machine guard 14.

3. Next, the single part enters a staging nest 12 where it is positioned on a precise location 13 for pick up by a CNC punch tool such as the tool of the present invention.

4. Finally, the punch or CNC bed moves to a location where the fastener held by the punch tool is installed.

Figure 2:
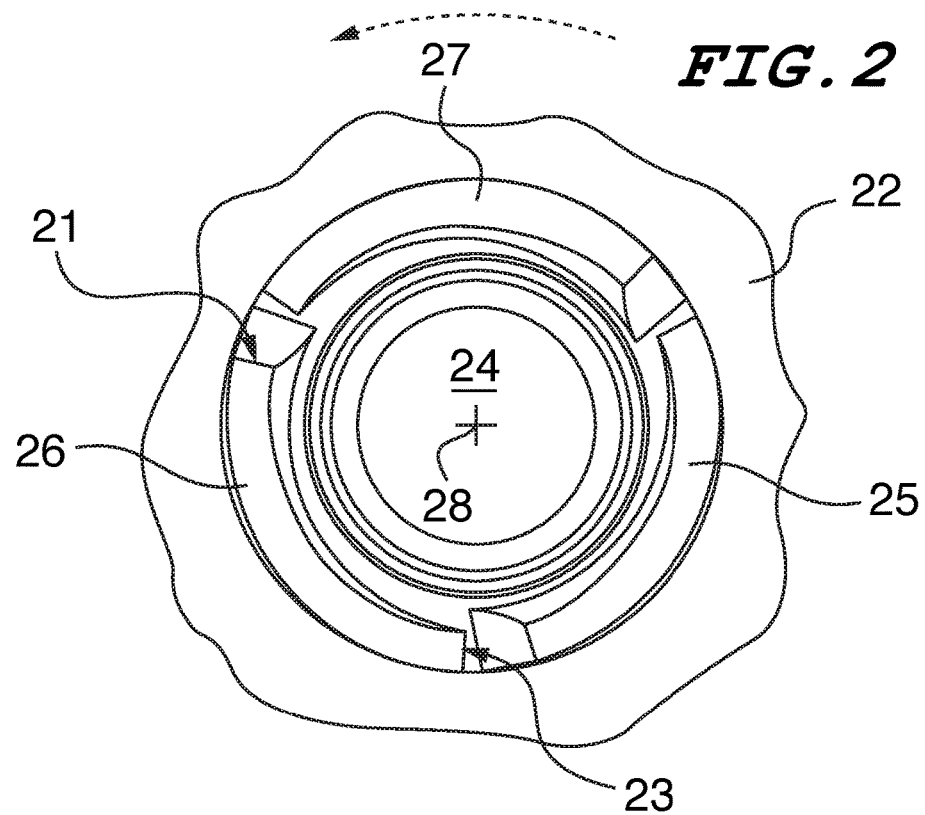
FIG. 2 is a bottom plan view of a rotary installation tool of the invention.

Referring now to FIG. 2, a bottom plan view of the tip of a rotary displacer punch tool 22 of one embodiment of the invention is shown. In this embodiment, three rotary displacers, 25, 26 and 27 are employed. During fastener installation, the displacers are driven against a metal receiving panel (not shown) as the punch tool 22 is rotated about axis 28. The displacers are helical in nature, being wedge shaped from the high point 21 to the low point 23 and are circularly curved about the center of the tool 22 defined by axis 28. The cross-sectional area of the displacers is reduced at contact with the installation panel compared to a full ring displacer. Hence, most of the required installation force is applied gradually for each rotation of the tool and axial progression, reducing the overall maximum axial force necessary. This system requires more torque to push the displacer through the metal rotationally than the force that is required to drive the displacers axially. The embodiments that follow as described in FIGS. 3A-7B each utilize this method of rotary fastener installation.

Figure 3A:
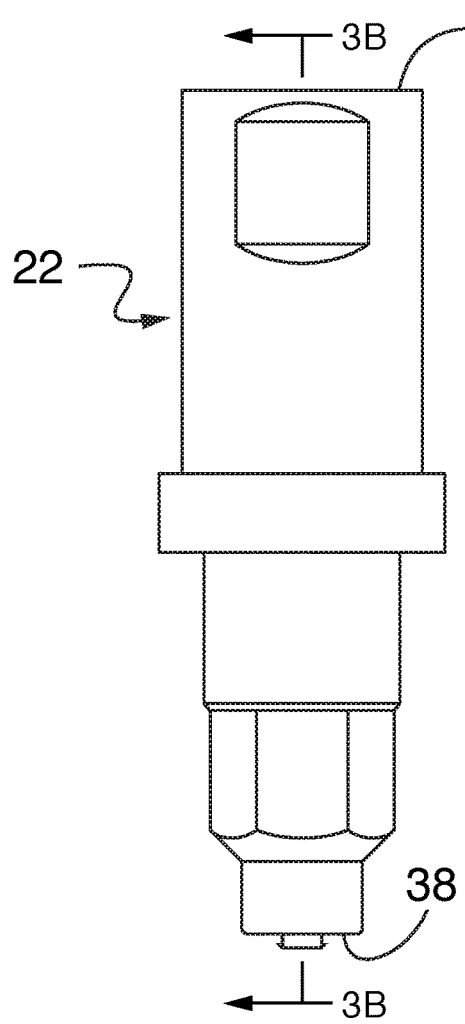
FIG. 3A is a front elevation view of a rotary installation tool.
Figure 3B:
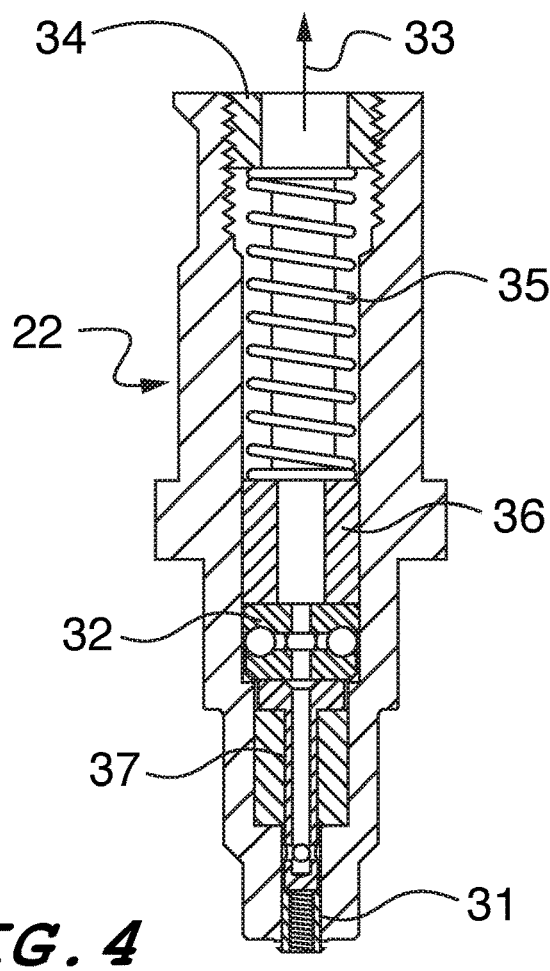
FIG. 3B is a side elevation sectional view taken from FIG. 3A.

FIG. 3A shows a front view and 3B shows a side section view of a CNC punch of the invention where a punch vacuum can be employed. The tool 22 as seen in FIG. 2 and depicted in FIG. 3A is sized at a top drive end 30 to be held by a standard tool holder so that it will operate bottom working end 38 with the automatic tool changing system in a CNC machining center. Referring to FIG. 3B, the die spring 35 provides a resilient limiting force that pushes on a pusher pin 37 at the working end tip of the punch tool. The punch tool presses the rotary install fastener 31 to the bottom of the blind flat-bottomed installation hole as the rotating tool is moved against the receiving panel. As the punch tool turns with the fastener in the hole pressed against the panel, the fastener as well as the part pusher pin does not turn as it is isolated from the rotary motion by a thrust bearing 32 located between the spring 35 and the pusher pin 37. Compression force on the spring and hence the force that presses the fastener to the bottom of the hole is adjustable by turning the hollow set screw 34 at the top of the punch. A hollow airway through the components from the top of the punch to the tip provides a path for a controlled vacuum 33 to pick up, hold, and then release the fastener after installation.

Figure 4:
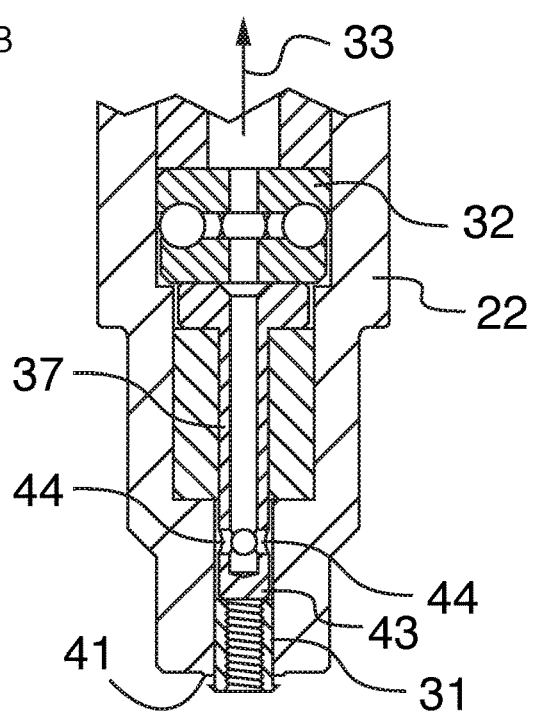
FIG. 4 is an enlarged partial view of FIG. 3B.

FIG. 4 is a close-up view of the bottom portion of FIG. 3B and shows more detail of the tool working end tip and illustrates how vacuum 33 can be diverted to the edge of a hollow standoff fastener through lateral ports 44 in the side wall of pusher pin 37. This allows the punch tool 22 to pick up the fastener 31 without losing suction through the hollow center of the standoff fastener 31 which is blocked by the end wall 43 of the pusher pin 37. Therefore, this type of punch can be used with s variety of fasteners whether hollow, or solid. Displacer 41 can also be seen in this view.

Figure 5A:
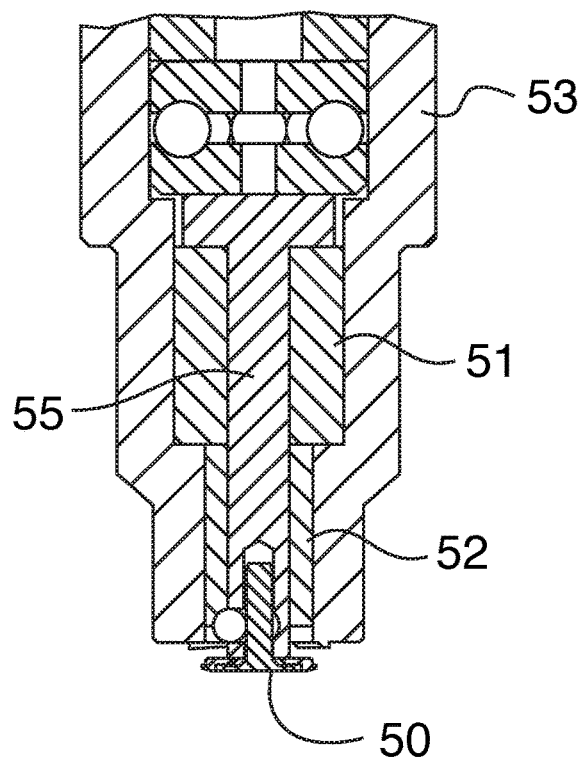
FIG. 5A is a front elevation sectional view.
Figure 5B:
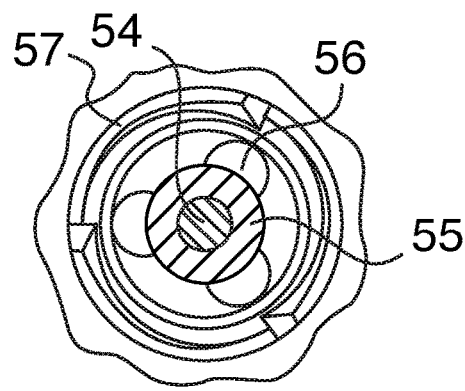
FIG. 5B is a bottom plan sectional view.
Figure 5C:
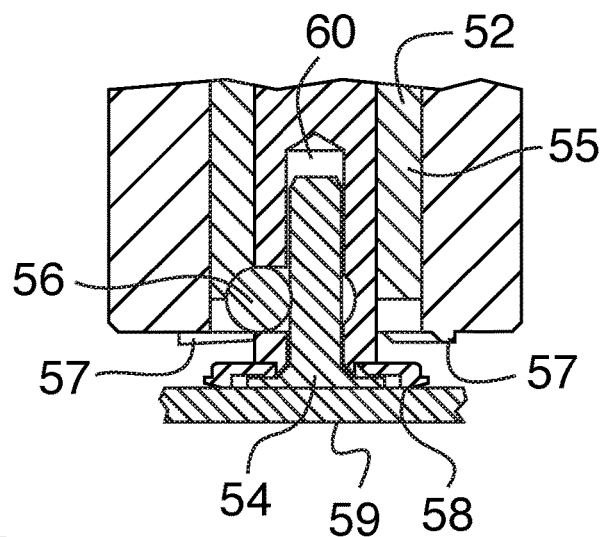
FIG. 5C is a partial enlarged view of FIG. 5A.

FIGS. 5A, 5B and 5C show various views of a tooling system as applied to the installation of a floating pin assembly 50 comprising retainer 58 and floating pin 54 more clearly seen in the close-up view of FIG. 5C. In this application as well as many others a vacuum is not employed because in some cases it may be difficult or impossible to supply a vacuum source through the spindle of the CNC milling machine. The punch tip shown here does not require a vacuum to pick up and release the fastener but instead employs a friction gripping mechanism.

In this instance a very small diameter pin 54 is held by the gripping pressure of three hard balls 56 of any suitable material forming jaws that are pushed inward by an elastomer band 52. The balls move radially within cylindrical channels cross-cut into the pusher pin 55 that has a cavity in its end which receives the fastener pin 54. The fastener pin 54 easily slips into the pusher pin 55 of the tool 53 and is retained there by the pressure and friction created by the balls 56 and the elastomer band 52 that biases the balls 56 inwardly against the fastener pin. Because the balls provide an adequate but very limited amount of grip force, the fastener pin 54 slips out just as easily after installation. In this embodiment the vertical length of the elastomer bushing allows compression in a mostly upward direction. To compensate, a 45-degree chamfer on the inside edge of the elastomeric band 52 pushes the balls 56 downward and inward. The pusher pin 55 inside diameter is small enough the balls cannot escape inwardly and the gap between the punch body 53 and pusher pin is narrower than the diameter of the balls so they cannot escape outwardly. The balls are thus fully captivated.

During the automated installation process the tool of FIG. 5 is first moved to a pickup site where the floating pin assembly 50 is inserted into the tool pusher pin cavity 60 until it is centered therein and gripped by balls 56. Now the pin assembly is moved to an installation site above a panel 59 as seen in FIG. 5C. The floating pin assembly 50 is then installed into the panel as the tool 53 is rotated and axially moved downward against the panel. By this motion a chamfer on the pusher pin 55 centers the floating pin retainer 58 while forcing it against the panel. Simultaneously the displacers 57 on the tool body 53 force material of the panel into the retainer features to rigidly attach it to the panel. During this action the grip on the fastener pin is light enough for the tool to easily release the fastener pin when installation is complete, and the tool is moved upward away from the installation site.

Thus, the vacuum pusher pin of the tooling assembly in this instance serves four functions:
1. Hold and release the fastener pin when necessary.
2. Center the fastener pin in the punch.
3. Center the retainer on the floating pin.
4. Press downward on the retainer during installation.

Figure 6:
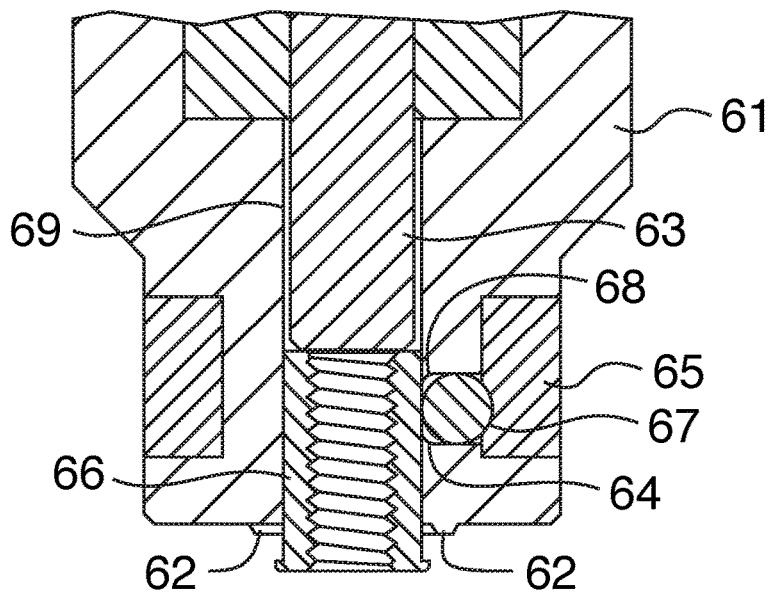
FIG. 6 is a front elevation sectional view of a rotary installation tool used in conjunction with an internally threaded fastener.

FIG. 6 illustrates another punch type that does not require vacuum and grips the outside diameter of a fastener using pressure being supplied radially by an elastic band 65 against three balls 67 that contact the fastener 66. The fastener 66 is received within the punch body 61 rather than the pusher pin 63 as in the previous embodiments. The balls 67 are retained in the cross-drilled lateral holes 68 of the punch tool body 61. A lip 64 at the inward end of each hole ensures that the balls 67 cannot completely enter the center bore 69 of the punch tool 61. As in FIG. 5, the balls 67 are constrained outwardly by the elastic band 65. As the punch 61 pushes down on a staged part 66 to pick it up, the balls 67 are pushed outward against the resilient force of the band 65 until the part passes between the balls, which then hold it in place for installation. Once the fastener is installed, the punch can pull upward freely off of the fastener. This style of punch is also suitable for installation of a solid pin.

FIG. 7 illustrates a punch for a magnetic release gripping fastener. Some gripping fasteners can grip a pin and then release it with a magnet. Installing this type of fastener also needs no vacuum. When using this type of fastener with this tooling application the CNC machining center inserts the punch pin into the staged fastener and picks it up without the need tooling attachment means since the fastener itself grips the tooling pusher pin. Once positioned over the workpiece into which it will be installed, a magnet in the anvil below the workpiece will disengage the fastener, releasing the punch to finish the installation and then retrieve another fastener.

Figure 7A:
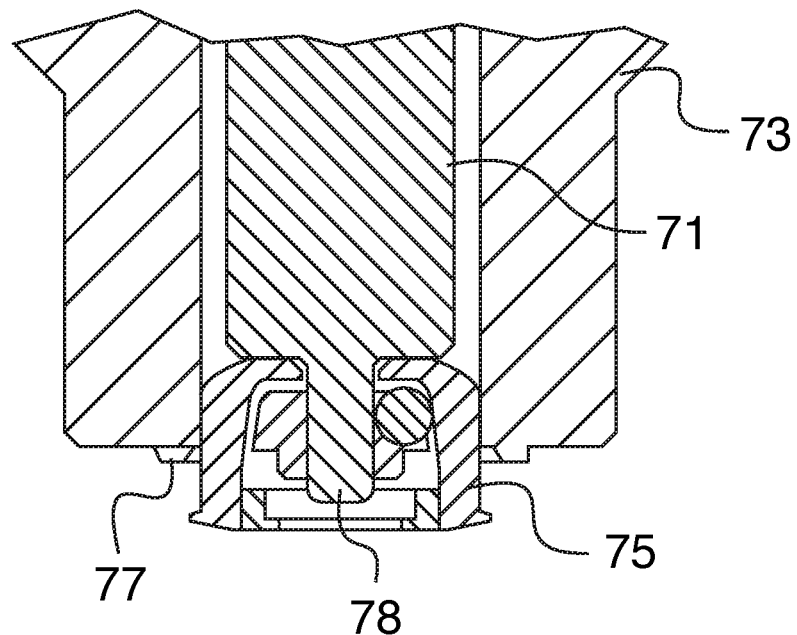
FIG. 7A is a partially sectioned front elevation view showing a rotary installation tool used in conjunction with a magnetic release pin gripping fastener.

In FIG. 7A we see the magnetic release fastener as it is picked up by punch tool 73. The tool has a pusher pin 71 that has a narrow end which fits into the fastener 75. The pin is spring-biased (not shown) as seen in the previous embodiments and is gripped by balls within the fastener 75. The punch tool 73 has rotary displacers 77 as seen in FIG. 2.

Figure 7B:
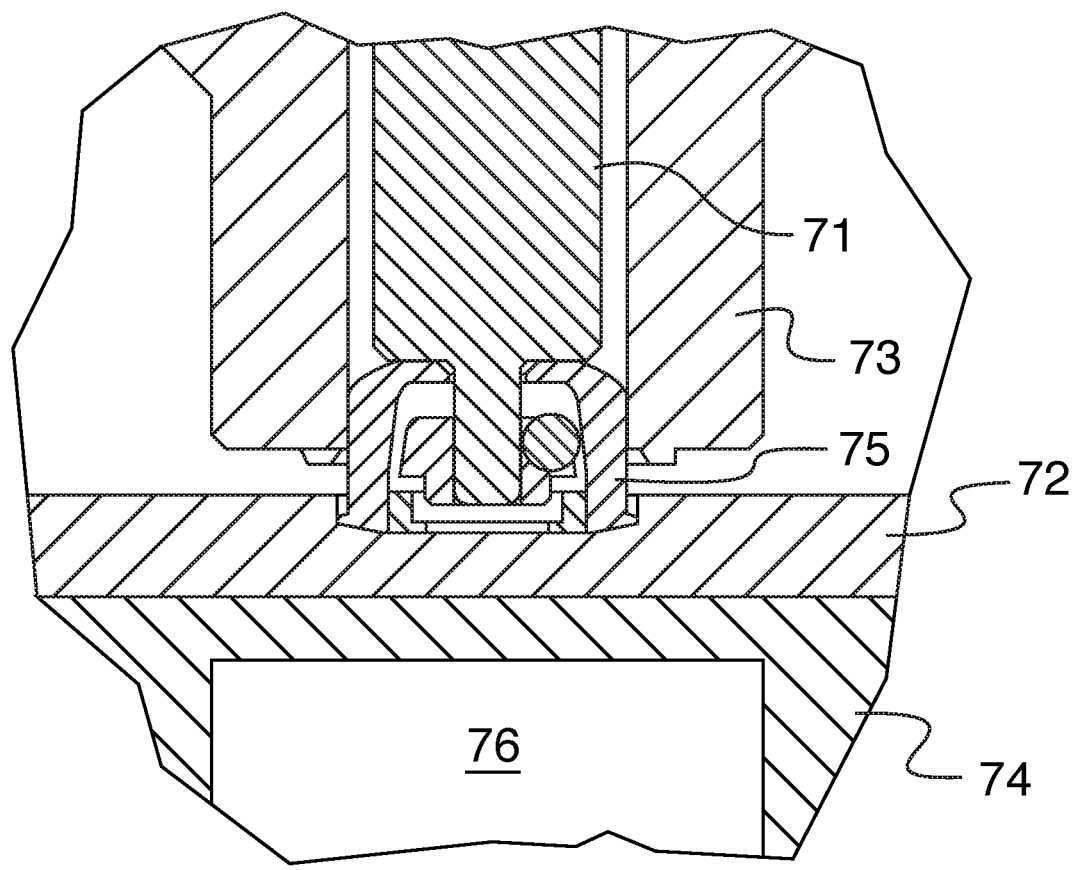
FIG. 7B is a partially sectioned front elevation view.

Referring now to FIG. 7B we see the installation of the magnetic release fastener 75 of FIG. 7A into a receiving panel 72 which in this embodiment has a blind receiving hole. When the fastener is seated in the hole, a magnet 76 within anvil 74 releases the fastener's grip on the pusher pin 71. During installation the tool 73 rotates as it axially presses the displacers against the panel 72 which is supported by the anvil 74. Since the fastener has been released the rotary motion of the tool is not transmitted to the fastener as it is installed. By the continued action of the tool, the displacers 77 move material of the panel 72 over a base flange of the fastener 75 thus affixing it to the panel.

While there are many aspects to the system described herein, in this embodiment where a magnetic release anvil is employed to perform the following functions:
1. The punch can be staged in the automatic tool changer of a standard CNC machining center.
2. The punch can pick up and hold a fastener for transport to its installation location.
3. The punch can rotate displacers to push metal over the flange of the fastener while keeping the fastener motionless.
4. The punch can release the fastener after the fastener is installed.

Thus, from the foregoing description of the various embodiments of the invention it will be apparent to those of skill in the art that the objects of the invention have been achieved. Other objects and advantages of the invention will be apparent to those of skill in the art from the foregoing description of various embodiments but not to be limited thereto. It should be understood that the invention shall be limited only by the following claims and their legal equivalents.

What is claimed is:

1. A tooling system for installing a fastener, comprising:
   a tool body having a top drive end and a bottom working end and centered about an axis of rotation;
   a plurality of helical displacers on the working end for acting upon a workpiece;
   a cavity in the tool body at the working end thereof for holding a fastener to be installed in the workpiece; and
   fastener-gripping means in the tool body cavity.

2. The tooling system of claim 1 further including means for simultaneously rotating the tool body while moving it axially.

3. The tooling system of claim 1 wherein the displacers comprise arcuate ramps centered about the axis of rotation and each displacer extending between points of maximum and minimum height of the ramps.

4. The tooling system of claim 1 wherein the displacers are identical and symmetrically disposed about the axis of rotation.

5. The tooling system of claim 1 wherein the tool body has an airway between the top and bottom ends whereby a vacuum holds the fastener in the cavity.

6. The tooling system of claim 5 wherein the cavity is located in the end of a resiliently biased pusher pin which acts between the tool body and the fastener and adapted to press upon the fastener during installation of the fastener into the workpiece.

7. The tooling system of claim 6 wherein the pusher pin is hollow and has lateral ports for exclusively providing a airway between the vacuum source and the fastener.

8. The tooling systems of claim 1 wherein the cavity is located in the bottom end of a resiliently biased pusher pin for applying a downward installation force to the fastener and having a spring acting between the tool body and a top end of the pusher pin.

9. The tooling system of claim 8 wherein the pusher pin has fastener-gripping means comprising a plurality of balls moveable within lateral passageways in the pusher pin open into the cavity in the pusher pin.

10. The tooling system of claim 9 wherein the balls are biased inwardly against the fastener by an outer elastic band which encircles the pusher pin.

11. The tooling system of claim 10 wherein a ball-engaging bottom end of the elastic band has a 45-degree chamfer.

12. The tooling system of claim 1 wherein the tool body has a plurality fastener-gripping balls moveable within lateral passageways in the tool body.

13. The tooling system of claim 12 wherein the balls are inwardly biased by an elastic band which encircles the passageways.

14. The tooling system of claim 13 wherein the inward end of each of the passageways has narrowing lip for retaining the balls.

15. The tooling systems of claim 1 wherein the tool body has axially centered pusher pin having a bottom end of reduced diameter adapted for insertion into a magnetic release fastener whereby the fastener is held onto the tooling.

16. The tooling system of claim 15 wherein the pusher pin has a collar which abuts the top of the fastener.

17. The tooling system of claim 15 further including an anvil for supporting a fastener receiving panel, said anvil having a magnet whereby the fastener is released from the pusher pin as the fastener is pressed into the panel by the tool body as it rotates.

18. The tooling system of claim 17 wherein the fastener has a flange at the bottom for receiving the cold flow of material from the panel displaced by the displacers.

19. A tooling system for installing a fastener, comprising:
a tool body having a top drive end and a bottom working end and centered about an axis of rotation;
a plurality of helical displacers on the working end for acting upon a workpiece;
a cavity in the tool body at the working end thereof for holding a fastener to be installed in the workpiece; and
means for simultaneously rotating the tool body while moving it axially consisting of a CNC machine adapted to move selected individual fasteners laterally from a pickup point to an installation point.

* * * * *